United States Patent
Jee et al.

(10) Patent No.: US 10,929,634 B2
(45) Date of Patent: Feb. 23, 2021

(54) TOUCH SENSOR, DISPLAY DEVICE INCLUDING THE SAME, AND OPERATING METHOD OF THE TOUCH SENSOR

(71) Applicant: Samsung Display Co., Ltd., Yongin-si (KR)

(72) Inventors: Yong Jin Jee, Yongin-si (KR); A Ram Song, Yongin-si (KR); Yun Ho Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 255 days.

(21) Appl. No.: 15/840,672

(22) Filed: Dec. 13, 2017

(65) Prior Publication Data

US 2018/0181787 A1    Jun. 28, 2018

(30) Foreign Application Priority Data

Dec. 28, 2016  (KR) .................. 10-2016-0181311

(51) Int. Cl.
| | |
|---|---|
| *G06K 9/00* | (2006.01) |
| *G06F 3/041* | (2006.01) |
| *G06F 3/044* | (2006.01) |

(52) U.S. Cl.
CPC ........... *G06K 9/0002* (2013.01); *G06F 3/044* (2013.01); *G06F 3/0416* (2013.01); *G06F 2203/04111* (2013.01)

(58) Field of Classification Search
None
See application file for complete search history.

(56) References Cited

U.S. PATENT DOCUMENTS

| | | |
|---|---|---|
| 8,564,314 B2 | 10/2013 | Shaikh et al. |
| 9,460,576 B2 | 10/2016 | Riedijk |
| 9,600,705 B2 | 3/2017 | Riedijk |
| 2015/0346253 A1 | 12/2015 | Wang et al. |
| 2016/0224818 A1 | 8/2016 | Song et al. |
| 2017/0024597 A1 | 1/2017 | Cho et al. |
| 2017/0336909 A1* | 11/2017 | Song .................. G06F 3/0416 |

FOREIGN PATENT DOCUMENTS

| | | |
|---|---|---|
| JP | 2006-14838 A | 1/2006 |
| KR | 10-2016-0096390 A | 8/2016 |

* cited by examiner

*Primary Examiner* — Atiba O Fitzpatrick
(74) *Attorney, Agent, or Firm* — Lewis Roca Rothgerber Christie LLP

(57) ABSTRACT

An operating method of a touch sensor includes sensing first touch intensities in a first touch-sensing area by using first touch cells, sensing second touch intensities in a second touch-sensing area that is adjacent to the first touch-sensing area by using second touch cells each having an area that is smaller than that of each of the first touch cells, grouping some second touch cells among the second touch cells as a touch-sensing group having a same area as one of the first touch cells, calculating a representative touch intensity of the touch-sensing group by using the second touch intensities sensed by second touch cells in the touch-sensing group, and detecting a touch position by using the first touch intensities and the representative touch intensity.

7 Claims, 9 Drawing Sheets

FIG. 4E

| | | | | | | | | | | |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 100 | 100 | 0 | 0 | 0 |
| 0 | 0 | 0 | 0 | 0 | 100 | 300 | 300 | 100 | 0 | 0 |
| 0 | 0 | 0 | 0 | 0 | 0 | 100 | 100 | 0 | 0 | 0 |

TC1, AR1, AR2, TL

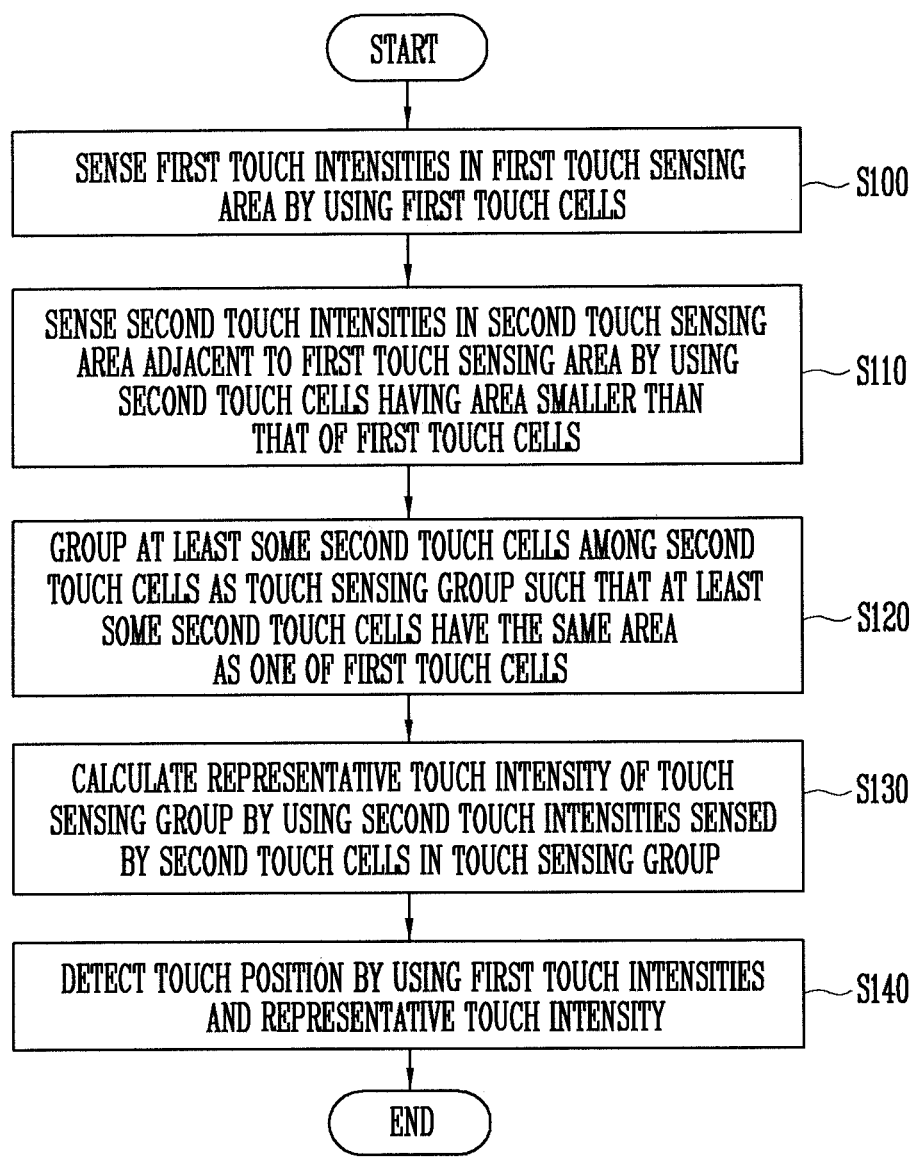

TOUCH SENSOR, DISPLAY DEVICE INCLUDING THE SAME, AND OPERATING METHOD OF THE TOUCH SENSOR

CROSS-REFERENCE TO RELATED APPLICATION

This application claims priority to, and the benefit of, Korean Patent Application No. 10-2016-0181311, filed on Dec. 28, 2016, in the Korean Intellectual Property Office, the entire disclosure of which is incorporated by reference herein.

BACKGROUND

1. Field

An aspect of the present disclosure relates to a touch sensor, a display device including the same, and an operating method of the touch sensor.

2. Description of the Related Art

As interest in information displays increases, and as demand for portable information media increases, research and commercialization has focused on display devices.

Recent display devices include touch sensors for receiving touch inputs of users in addition to the image display functions of the display devices. Accordingly, the users can more conveniently use the display devices through the touch sensors.

Various types of touch sensors are used. However, among these touch sensors, a capacitive touch sensor senses a point at which capacitance is changed as a hand of a user or an object is in contact therewith, thereby detecting a touch position. Because the capacitive touch sensor may sense a multi-touch and has excellent accuracy, the capacitive touch sensor has recently been widely used.

SUMMARY

According to an aspect of the present disclosure, there is provided a method of operating a touch sensor, the method including sensing first touch intensities in a first touch-sensing area by using first touch cells, sensing second touch intensities in a second touch-sensing area that is adjacent to the first touch-sensing area by using second touch cells each having an area that is smaller than that of each of the first touch cells, grouping some second touch cells among the second touch cells as a touch-sensing group having a same area as one of the first touch cells, calculating a representative touch intensity of the touch-sensing group by using the second touch intensities sensed by second touch cells in the touch-sensing group, and detecting a touch position by using the first touch intensities and the representative touch intensity.

Sensing the first touch intensities may include sensing changes of mutual capacitances between first driving electrodes in the first touch cells and first sensing electrodes crossing the first driving electrodes.

Sensing the second touch intensities may include sensing changes of mutual capacitances between second driving electrodes in the second touch cells and second sensing electrodes crossing the second driving electrodes.

Calculating the representative touch intensity may include comparing the second touch intensity sensed by each of the second touch cells in the touch-sensing group with a threshold value, determining the second touch cells in the touch-sensing group to be in a touch-sensing state when the second touch intensity is greater than or equal to the threshold value, determining the second touch cells in the touch-sensing group to be in a touch non-sensing state when the second touch intensity is smaller than the threshold value, calculating a ratio of the second touch cells in the touch-sensing group in the touch-sensing state among the second touch cells in the touch-sensing group, and calculating the representative touch intensity by multiplying the ratio by a maximum touch intensity sensed by the first touch cells.

Detecting the touch position may include detecting a maximum value among the first touch intensities and the representative touch intensity, and determining an area corresponding to the maximum value as the touch position.

The method may further include sensing a fingerprint on the second touch-sensing area by using the second touch intensities in a fingerprint-sensing mode.

Calculating the representative touch intensity may include determining representative touch cells among the second touch cells in the touch-sensing group, comparing the second touch intensity sensed by each of the representative touch cells with a threshold value, determining the representative touch cells to be in a touch-sensing state when the second touch intensity is greater than or equal to the threshold value, determining the representative touch cells to be in a touch non-sensing state when the second touch intensity is smaller than the threshold value, calculating a ratio of the representative touch cells in the touch-sensing state to the representative touch cells in the touch-sensing group, and calculating the representative touch intensity by multiplying the ratio by a maximum touch intensity sensed by the first touch cells.

According to another aspect of the present disclosure, there is provided a touch sensor including a plurality of first touch cells arranged on a first touch-sensing area, a plurality of second touch cells arranged on a second touch-sensing area that is adjacent to the first touch-sensing area, the second touch cells each having an area that is smaller than that of each of the first touch cells, and a touch controller configured to calculate a touch position by using touch intensities sensed by the first and second touch cells, wherein the touch controller is configured to calculate a touch position on the first and second touch-sensing areas by using the first and second touch cells in a touch-sensing mode, and sense a fingerprint on the second touch-sensing area by using the second touch cells in a fingerprint-sensing mode.

Each of the first touch cells may include first driving electrodes, and first sensing electrodes crossing the first driving electrodes, and each of the second touch cells may include second driving electrodes spaced apart from the first driving electrodes, and second sensing electrodes that cross the second driving electrodes and that are spaced apart from the first sensing electrodes.

A space between adjacent ones of the second driving electrodes may be narrower than a space between adjacent ones of the first driving electrodes, and a space between adjacent ones of the second sensing electrodes may be narrower than a space between adjacent ones of the first sensing electrodes.

The touch controller may include a first touch controller configured to supply first driving signals to the first driving electrodes, receive a first sensing signal generated corresponding to the first driving signals from the first sensing electrodes, and sense a touch intensity in the first touch-sensing area by using the first sensing signal, and a second touch controller configured to supply second driving signals to the second driving electrodes, and receive a second sensing signal corresponding to the second driving signals from the second sensing electrodes.

In the touch-sensing mode, the touch controller may be configured to scale second touch intensities sensed by the second touch cells, and calculate the touch position by using the scaled second touch intensities and first touch intensities sensed by the first touch cells.

The first touch cells and the second touch cells may be arranged in a matrix form.

The first touch-sensing area and the second touch-sensing area might not overlap with each other.

According to still another aspect of the present disclosure, there is provided a display device including a display unit configured to display an image on one surface thereof, and a touch sensor on the one surface of the display unit to sense a touch, and including a plurality of first touch cells arranged on a first touch-sensing area, a plurality of second touch cells arranged on a second touch-sensing area that is adjacent to the first touch-sensing area, the second touch cells each having an area that is smaller than that of each of the first touch cells, and a touch controller configured to calculate a touch position by using touch intensities sensed by the first and second touch cells, wherein the touch controller is configured to calculate a touch position on the first and second touch-sensing areas by using the first and second touch cells in a touch-sensing mode, and sense a fingerprint on the second touch-sensing area by using the second touch cells in a fingerprint-sensing mode.

The first and second touch-sensing areas may be located on the one surface on which the image is displayed.

BRIEF DESCRIPTION OF THE DRAWINGS

Example embodiments will now be described more fully hereinafter with reference to the accompanying drawings.

FIGS. 4A, 4B, 4C, 4D, and 4E are views illustrating an operating method of the touch sensor according to an embodiment of the present disclosure.

FIG. 6 is a flowchart illustrating an operating method of the touch sensor according to an embodiment of the present disclosure.

DETAILED DESCRIPTION

Figure 1:
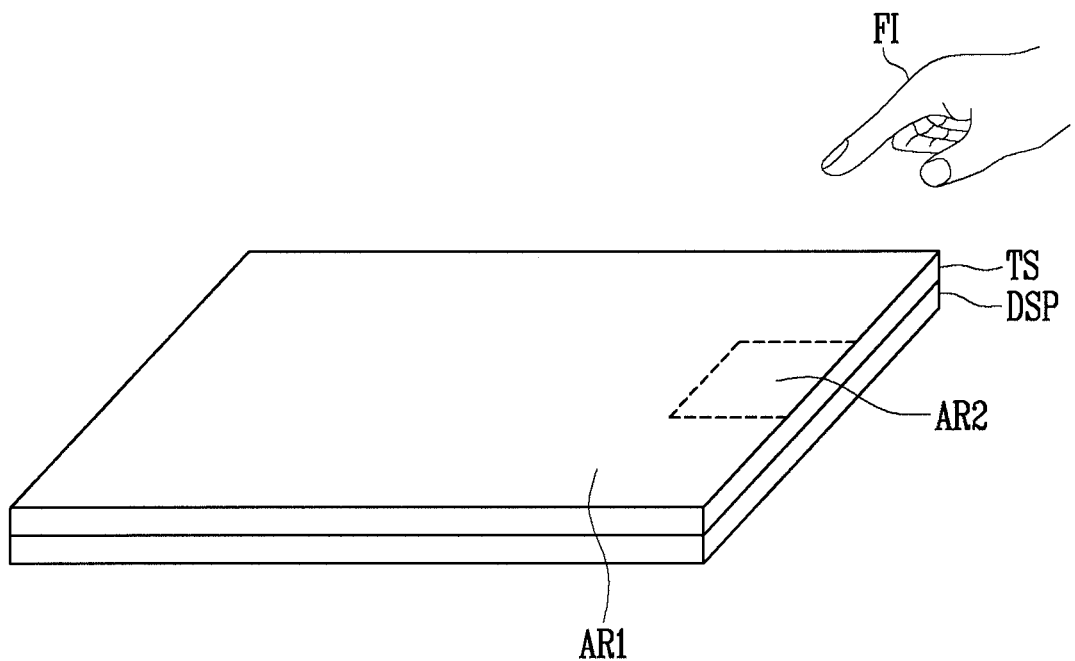
FIG. 1 is a view illustrating a display device according to an embodiment of the present disclosure.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

In the following examples, the x-axis, the y-axis and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a view illustrating a display device according to an embodiment of the present disclosure.

Referring to FIG. 1, the display device according to the present embodiment may include a display unit DSP that displays an image, and a touch sensing unit TS located on one surface of the display unit DSP.

The display device may be provided in a rectangular plate shape having two pairs of respectively parallel sides. In the display device, any one pair of sides among the two pairs of sides may be longer than the other pair of sides, but the present disclosure is not limited thereto. For example, the display device may be provided in various shapes, such as a circular shape, and a rectangular shape including curved corners.

The display unit DSP may display, on one surface thereof, visual information (e.g., arbitrary information, a text, a video, a picture, a two-dimensional or three-dimensional image, etc.), and the visual information may be displayed as an "image." However, the type of the display unit DSP is not particularly limited to ones that display images.

The touch sensing unit TS may include a touch sensor that recognizes a touch event generated by a finger FI of a user, or by a separated input means. The touch sensor is used to sense a touch and/or a pressure by using sensing electrodes, and the kind of the touch sensor is not particularly limited.

For example, the touch sensor may be implemented using a capacitive method, a piezoresistive method, or the like. The capacitive method may include a mutual capacitance method, in which a change in capacitance that is generated by an interaction between two sensing electrodes is sensed, or a self-capacitance method, in which a change in capacitance of a sensing electrode itself is sensed.

In addition, according to a touch-sensing mode, the touch sensor may sense a touch in first and second touch areas AR1 and AR2 in touch sensing (e.g., sensing a touch in a touch-sensing mode), and may sense a fingerprint in the second touch-sensing area AR2 in fingerprint sensing (e.g., sensing a fingerprint in a fingerprint-sensing mode). Here, the first and second touch-sensing areas AR1 and AR2 may be defined as areas in which a touch input by a user can be sensed. The first and second areas AR1 and AR2 may correspond to an image display area(s).

That is, in touch sensing, the touch sensor may sense a touch of a user in the first touch-sensing area AR1, and may sense a touch of the user even in the second touch-sensing area AR2.

Although an embodiment in which the second touch-sensing area AR2 is biasedly located at one side of the touch sensing unit TS is illustrated in FIG. 1, the present disclosure is not limited thereto, and the second touch-sensing area AR2 may be located at the center of the touch sensing unit TS or at a position outside of the center. In addition, the shape of the second touch-sensing area AR2 is not limited to a rectangular shape, and the second touch-sensing area AR2 may be provided in various shapes, such as a circle, an ellipse, a semicircle, a semi-ellipse, etc., and may include linear and curved sides. In addition, the second touch-sensing area AR2 may be provided at a plurality of positions on the touch sensing unit TS.

In FIG. 1, it is illustrated that the first and second touch-sensing areas AR1 and AR2 do not overlap with each other, but the present disclosure is not limited thereto. For example, portions of the first and second touch-sensing areas AR1 and AR2 may overlap with each other, or the second touch-sensing area AR2 may be located on the first touch-sensing area AR1 to overlap with the first touch-sensing area AR1.

Figure 2:
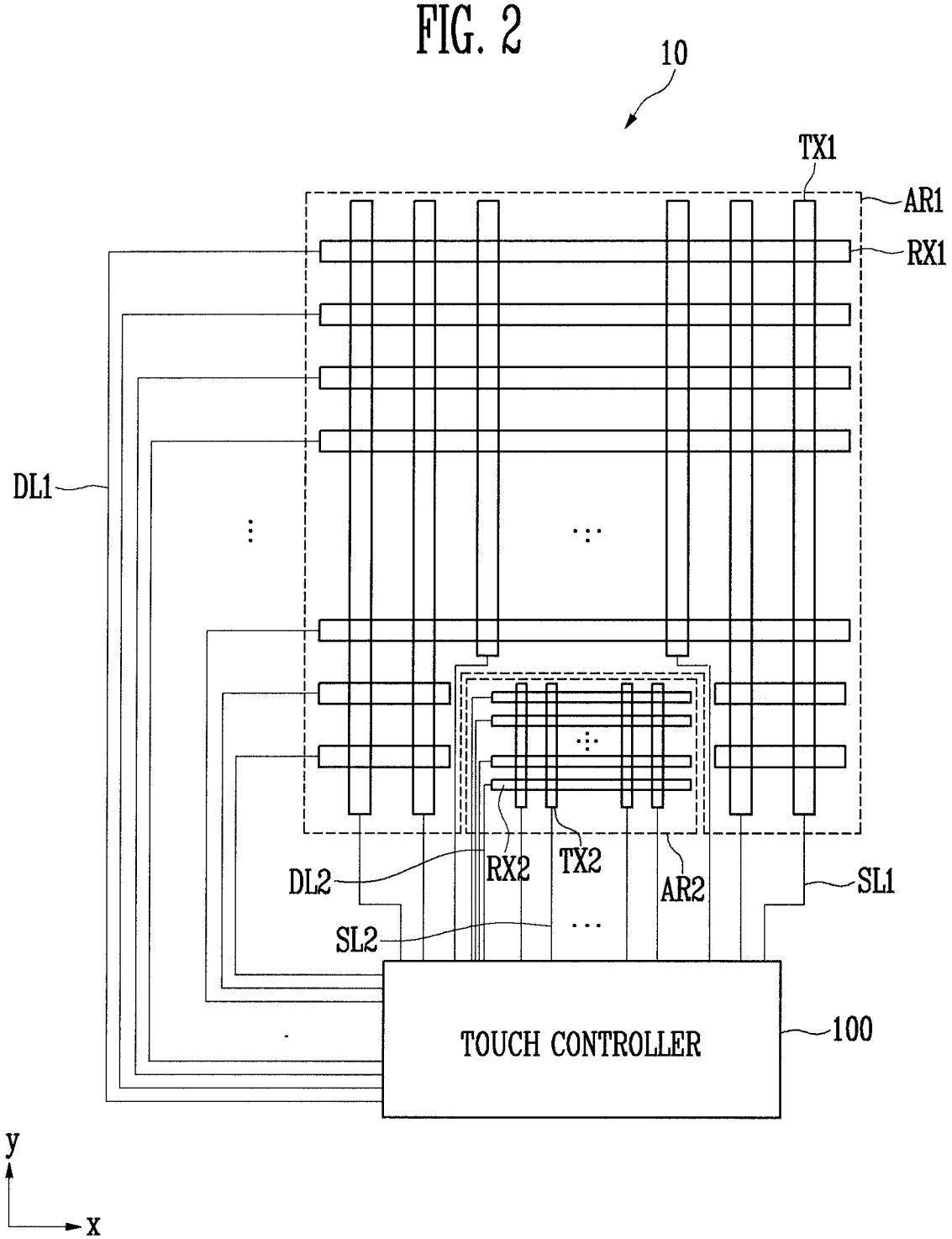
FIG. 2 is a view illustrating a touch sensor according to an embodiment of the present disclosure.
Figure 3:
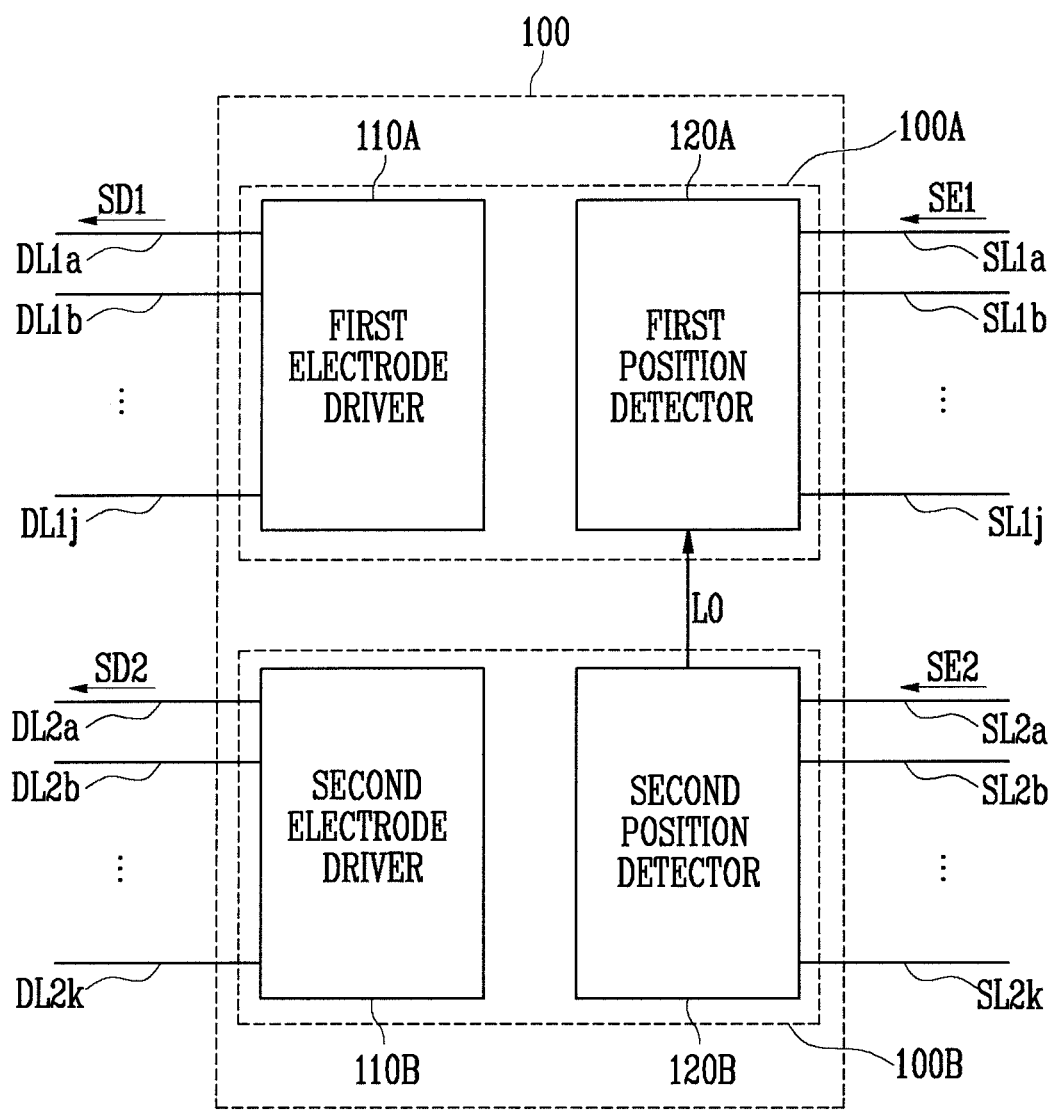
FIG. 3 is a view illustrating a touch controller shown in FIG. 2.

FIG. 2 is a view illustrating a touch sensor according to an embodiment of the present disclosure. FIG. 3 is a view illustrating a touch controller shown in FIG. 2.

Referring to FIG. 2, the touch sensor 10 according to the present embodiment may include first driving electrodes TX1, first sensing electrodes RX1, second driving electrodes TX2, second sensing electrodes RX2, and a touch controller 100.

The first driving electrodes TX1 and the first sensing electrodes RX1 may be arranged in a first touch-sensing area AR1. The first driving electrode TX1 may be formed to extend in a first direction (e.g., a y-axis direction), and may be arranged in plural numbers along a second direction (e.g., an x-axis direction) that crosses the first direction. In addition, the first sensing electrode RX1 may be formed to extend in the second direction, and may be arranged in a plural numbers along the first direction. Although the first driving electrodes TX1 may be arranged in the same number as that of the first sensing electrodes RX1, the present disclosure is not limited thereto, and the first driving electrodes TX1 may be arranged in a different number from that of the first sensing electrodes RX1.

The second driving electrodes TX2 and the second sensing electrodes RX2 may be arranged in a second touch-sensing area AR2. The second driving electrode TX2 may be formed to extend in the first direction, and may be arranged in plural numbers along the second direction. In addition, the second sensing electrode RX2 may be formed to extend in the second direction, and may be arranged in a plural numbers along the first direction. In this case, the second driving electrodes TX2 may be located to be spaced apart from the first driving electrodes TX1, and the second sensing electrodes RX2 may be located to be spaced apart from the first sensing electrodes RX1. Although the second driving electrodes TX2 may be arranged in the same number as that of the second sensing electrodes RX2, the present disclosure is not limited thereto, and the second driving electrodes TX2 may be arranged in a different number from that of the second sensing electrodes RX2.

Although an embodiment in which the first and second driving electrodes TX1 and TX2 are formed to extend in the first direction is illustrated in FIG. 2, the present disclosure is not limited thereto, and the first and second driving electrodes TX1 and TX2 may be formed to extend in different directions. In addition, although an embodiment in which the first and second sensing electrodes RX1 and RX2 are formed to extend in the second direction is illustrated in FIG. 2, the present disclosure is not limited thereto, and the first and second sensing electrodes RX1 and RX2 may be formed to extend in different directions.

The second driving electrodes TX2 may be arranged to be separated by a narrow distance as compared with the first driving electrodes TX1, and the second sensing electrodes RX2 may be arranged to be separated by a narrow distance as compared with the first sensing electrodes RX1.

For example, the first driving electrodes TX1 may be arranged at a first distance along the second direction, and the second driving electrodes TX2 may be arranged at a second distance along the second direction. The second distance may be smaller than the first distance.

For example, the first sensing electrodes RX1 may be arranged at a third distance along the first direction, and the second sensing electrodes RX2 may be arranged at a fourth distance along the first direction. The fourth distance may be smaller than the third distance.

Meanwhile, a fingerprint of the finger FI of the user includes ridges and valleys. The touch sensor 10 may recognize the fingerprint by sensing differences between capacitances that correspond to distances of respective second sensing electrodes RX2 from the ridges of the fingerprint and capacitances that correspond to distances of respective second sensing electrodes RX2 from the valleys of the fingerprint. When the finger FI is touched to the touch sensing unit TS, the ridges may be in contact with the touch sensing unit TS, but the valleys might not be in contact with, or may be separated from, the touch sensing unit TS.

Therefore, the second driving electrodes TX2 and the second sensing electrodes RX2 may be arranged more densely than the ridges and valleys of the fingerprint so as to sense the fingerprint.

For example, if it is assumed that the distance between the ridge and valley of the fingerprint is about 500 μm, the second distance between the second driving electrodes TX2 and the fourth distance between the second sensing electrodes RX2 may be smaller than about 500 μm.

The first and second driving electrodes TX1 and TX2 and the first and second sensing electrodes RX1 and RX2 may include a conductive material. For example, each of the first and second driving electrodes TX1 and TX2 and the first and second sensing electrodes RX1 and RX2 may include at least one of gold (Au), silver (Ag), aluminum (Al), molybdenum (Mo), chromium (Cr), titanium (Ti), nickel (Ni), neodymium (Nd), copper (Cu), platinum (Pt), and any alloy thereof.

In addition, the first and second driving electrodes TX1 and TX2 and the first and second sensing electrodes RX1 and RX2 may be made of a transparent conductive material. For example, each of the first and second driving electrodes TX1 and TX2 and the first and second sensing electrodes RX1 and RX2 may include at least one of silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nano tube (CNT), graphene, and the like. Also, each of the first and second driving electrodes TX1 and TX2 and the first and second sensing electrodes RX1 and RX2 may be formed in a single layer or in a multi-layer.

The first driving electrodes TX1 and the first sensing electrodes RX1 may be made of the same material, or be made of different materials. In addition, the second driving electrodes TX2 and the second sensing electrodes RX2 may be made of the same material, or be made of different materials.

Meanwhile, in FIG. 2, it is briefly illustrated that the first and second driving electrodes TX1 and TX2 and the first and second sensing electrodes RX1 and RX2 are formed in a bar shape. However, the shape of the first and second driving electrodes TX1 and TX2 and the first and second sensing electrodes RX1 and RX2 may be variously changed.

The touch controller 100 may sense a touch on the first and/or second touch-sensing areas AR1 and AR2, or may sense a fingerprint on the second touch-sensing area AR2.

The touch controller 100 may supply a first driving signal SD1 to the first driving electrodes TX1 through first driving lines DL1, and may supply a second driving signal SD2 to the second driving electrodes TX2 through second driving lines DL2.

The touch controller 100 may sense a touch by using a first sensing signal SE1 received from the first sensing electrodes RX1 through first sensing lines SL1. The touch controller 100 may sense a touch or a fingerprint by using a second sensing signal SE2 received from the second sensing electrodes RX2 through second sensing lines SL2.

That is, the touch controller 100 may detect a variation in capacitance, which may be generated by a touch, by using the first and second sensing signals SE1 and SE2, and may sense a touch or a fingerprint through the detected variation in capacitance.

Referring to FIG. 3, the touch controller 100 may include a first touch controller 100A that controls the electrodes on the first touch-sensing area AR1, and a second touch controller 100B that controls the electrodes on the second touch-sensing area AR2.

The first touch controller 100A may include a first electrode driver 110A and a first position detector 120A. The first electrode driver 110A may supply first driving signals SD1 to the respective first driving electrodes TX1 through first driving lines DL1a to DL1j, and the first position detector 120A may receive first sensing signals SE1 from the respective first sensing electrodes RX1 through first sensing lines SL1a to SL1j.

The first position detector 120A may calculate a first touch intensity on the first touch-sensing area AR1 by detecting a variation in capacitance that is generated by a touch by using the first sensing signals SE1, and may detect a touch position by using the calculated result.

The second touch controller 100B may include a second electrode driver 110B and a second position detector 120B. The second electrode driver 110B may supply second driving signals SD2 to the respective second driving electrodes TX2 through second driving lines DL2a to DL2k, and the second position detector 120B may receive second sensing signals SE2 from the respective second sensing electrodes RX2 through second sensing lines SL2a to SL2k.

The second position detector 120B may calculate a second touch intensity on the second touch-sensing area AR2 by detecting a variation in capacitance that is generated by a touch by using the second sensing signals SE2, and may detect a fingerprint by using the calculated result.

According to the touch-sensing mode, the first position detector 120A, in touch sensing, may sense a touch on the first and second touch-sensing areas AR1 and AR2 by using first sensing signals SE1 and touch information LO provided from the second position detector 120B.

Specifically, the second position detector 120B may calculate a second touch intensity on the second touch-sensing area AR2 by using second sensing signals SE2, and may generate touch information LO by scaling the second touch intensity. The second position detector 120B may provide the touch information LO to the first position detector 120A such that the first position detector 120A can detect a touch position on the first and second touch-sensing areas AR1 and AR2.

The first position detector 120A may detect a touch position by using the first touch intensity on the first touch-sensing area AR1 and the scaled second touch intensity on the second touch-sensing area AR2. For example, the first position detector 120 may detect a maximum value between the first touch intensity and the scaled second touch intensity, and may determine an area corresponding to the maximum value as the center of the touch position.

According to the touch-sensing mode, the second position detector 120B, in fingerprint sensing, may calculate a second touch intensity on the second touch-sensing area AR2 by using only second sensing signals SE2, and may detect a fingerprint according to a distribution of the second touch intensity.

In some embodiments, the first electrode driver 110A may simultaneously supply a first driving signal SD1 to at least two adjacent first driving electrodes TX1 among the first driving electrodes TX1. In addition, the second electrode driver 110B may simultaneously supply a second driving signal SD2 to at least two adjacent second driving electrodes TX2 among the second driving electrodes TX2. As described above, the first electrode driver 110 simultaneously supplies a first driving signal SD1 to at least two adjacent first driving electrodes TX1 so that a driving time for touch sensing can be reduced.

Because the sensing electrodes and the driving electrodes are arranged at a narrow distance, the touch sensor 10 that recognizes a fingerprint can recognize a fingerprint pattern only when the touch sensor 10 is to sense a signal of each electrode at high speed. Thus, the second electrode driver 110b simultaneously supplies a second driving signal SD2 to at least two adjacent second driving electrodes TX2 so that the driving time for fingerprint sensing can be reduced.

In other embodiments, the first electrode driver 110A may supply first driving signals SD1 to only odd-numbered or even-numbered first driving electrodes TX1 among the first driving electrodes TX1. In addition, the second electrode driver 110B may supply second driving signals SD2 to only odd-numbered or even-numbered second driving electrodes TX2 among the second driving electrodes TX2.

FIGS. 4A, 4B, 4C, 4D, and 4E are views illustrating an operating method of the touch sensor according to an embodiment of the present disclosure.

Figure 4A:
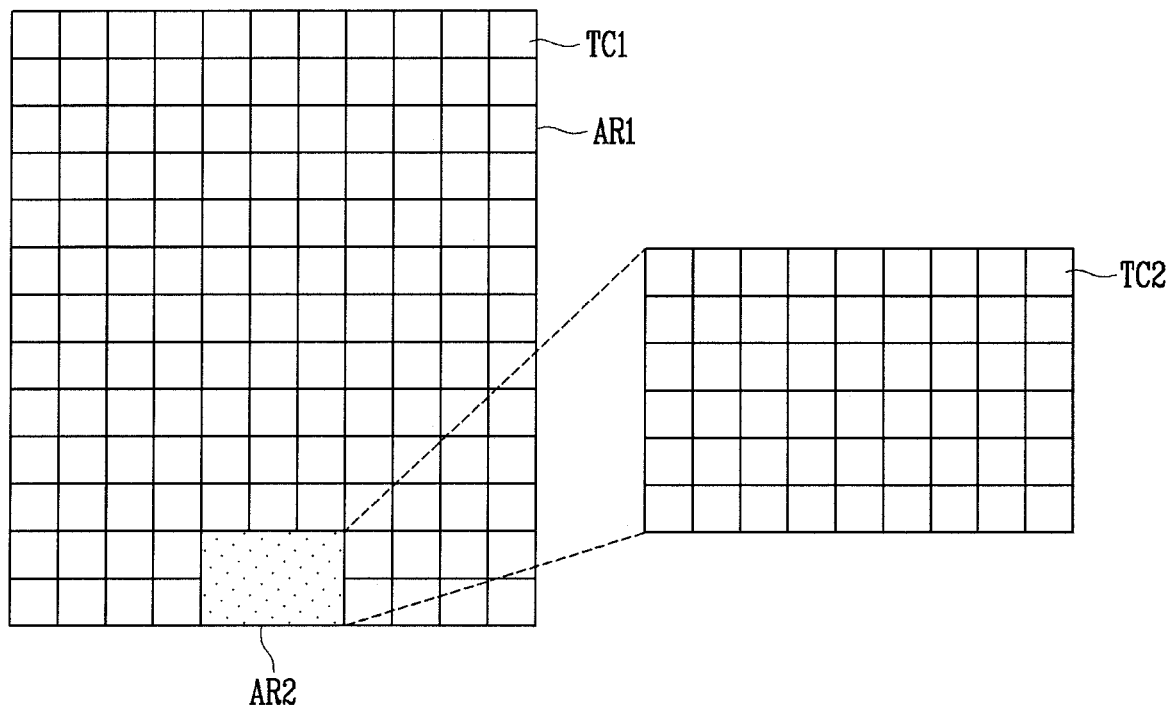

Referring to FIG. 4A, first touch cells TC1 are arranged on the first touch-sensing area AR1, and second touch cells TC2 are arranged on the second touch-sensing area AR2.

The first touch controller 100A may sense a first touch intensity on the first touch-sensing area AR1 by using the first touch cells TC1, and the second touch controller 100B may sense a second touch intensity on the second touch-sensing area AR2 by using the second touch cells TC2.

Here, the first touch cell TC1 is one area of the first touch-sensing area AR1, which includes a first driving electrode TX1 and a first sensing electrode RX1, and means a unit area in which a touch can be sensed by a mutual capacitance formed between the first driving electrode TX1 and the first sensing electrode RX1.

In addition, the second touch cell TC2 is one area of the second touch-sensing area AR2, which includes a second driving electrode TX2 and a second sensing electrode RX2, and means a unit area in which a touch or fingerprint can be sensed by a mutual capacitance formed between the second driving electrode TX2 and the second sensing electrode RX2. Also, the second touch cell TC2 has an area that is smaller than that of the first touch cell TC1 to be able to sense the fingerprint.

Although the first and second touch cells TC1 and TC2 may be arranged in a matrix form, the present disclosure is not limited thereto, and the arrangement of the first and second touch cells TC1 and TC2 may be changed depending on the arrangement of the first and second driving electrodes TX1 and TX2 and the first and second sensing electrodes RX1 and RX2.

Figure 4B:
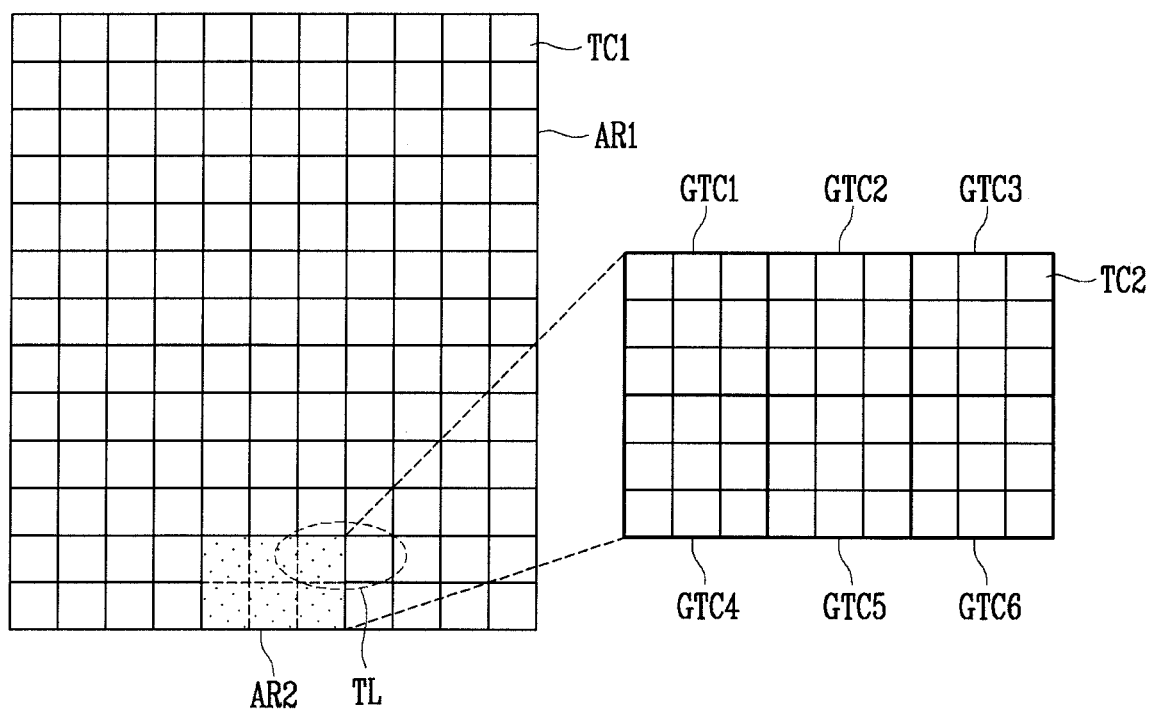

Referring to FIG. 4B, in touch sensing, the second touch controller 100B may group the second touch cells TC2 into touch-sensing groups so as to sense a touch TL on the second touch-sensing area AR2.

When a portion of the touch TL is generated on the first touch-sensing area AR1 and another portion of the touch TL is generated on the second touch-sensing area AR2, the first touch controller 100A may determine a touch position by simply comparing a first touch intensity sensed using the first touch cell TC1 with a second touch intensity sensed by the second touch controller 100B. Because the area of the second touch cell TC2 is smaller than that of the first touch cell TC1, when the first touch controller 100A determines a touch position by simply comparing a first touch intensity of the first touch cell TC1 with a second touch intensity of the second touch cell TC2, the determined touch position may be different from an actual touch position.

Therefore, in order to equivalently compare the first touch cells TC1 with the second touch cells TC2, the second touch controller 100B may group the second touch cells TC2 into touch-sensing groups such that at least some second touch cells TC2 (e.g., a collective group of the second touch cells TC2) among the second touch cells TC2 have the same area as the first touch cell TC1.

For example, when the sum of areas of nine second touch cells TC2 is equal to that of the first touch cell TC1, the second touch controller 1006 may group nine second touch cells TC2 as a touch-sensing group. In this case, when 54 second touch cells TC2 are arranged on the second touch-sensing area AR2, the second touch cells TC2 may be grouped into first to sixth touch-sensing groups GTC1 to GTC6.

Figure 4C:
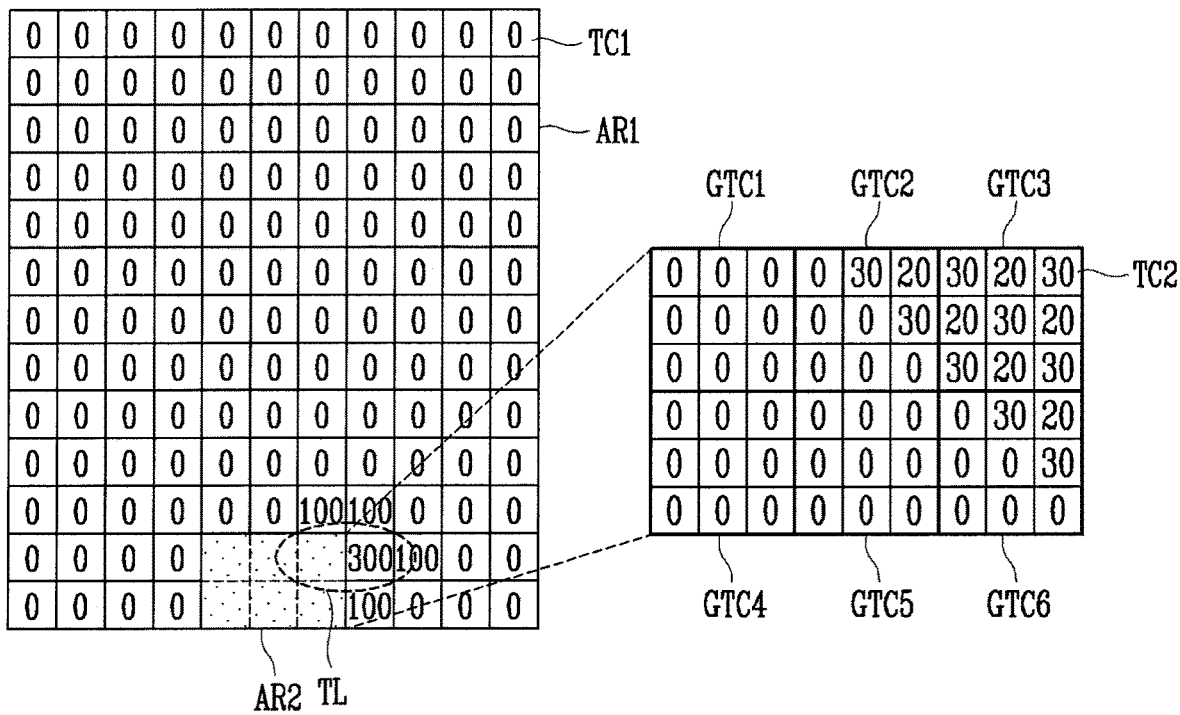

Referring to FIG. 4C, there are illustrated first touch intensities sensed by the respective first touch cells TC1 on the first touch-sensing area AR1, and second touch intensities sensed by the respective second touch cells TC2 on the second touch-sensing area AR2.

In FIG. 4C, that the first and second touch intensities are represented as specific real numbers is provided for convenience of description, and the first and second touch intensities are not limited to the specific real numbers.

The first touch controller 100A may calculate a first touch intensity of the whole of the first touch-sensing area AR1 by using the first touch cells TC1. The first touch controller 100A, by using first sensing signals SE1, may determine first touch intensities of first touch cells TC1 on which a touch TL is generated as real numbers that are not equal to 0, and may determine first touch intensities of first touch cells TC1 on which the touch TL is not generated as 0.

In addition, when the touch TL is generated on the whole of the first touch cells TC1, the first touch controller 100A may determine the first touch intensity as a maximum value. Also, when the touch TL is generated on some of the first touch cells TC1, the first touch controller 100A may determine the first touch intensity as a specific value between 0 and the maximum value. In this case, the specific value may be determined as a value between 0 to the maximum value, corresponding to the first sensing signal SE1.

For example, the first touch controller 100A may determine the first touch intensity as 300 when the touch TL is generated on the whole of the first touch cells TC1, and may determine the first touch intensity as 100 when the touch TL is generated on some of, or a portion of, individual first touch cells TC1.

The second touch controller 100B may calculate a second touch intensity of the whole of the second touch-sensing area AR2 by using the second touch cells TC2. The second touch controller 100B, by using second sensing signals SE2, may determine second touch intensities of second touch cells TC2 on which a touch TL is generated as real numbers not equal to 0, and may determine second touch intensities of second touch cells TC2 on which the touch TL is not generated as 0.

In addition, because a fingerprint includes ridges and valleys, it may be determined that second touch intensities of second touch cells TC2 that are in contact with the ridges are greater than those of second touch cells TC2 that are in contact with the valleys.

For example, the second touch controller 100B may determine the second touch intensities of the second touch cells TC2 that are in contact with the ridges of the fingerprint as 30, and may determine the second touch intensities of the second touch cells TC2 that are in contact with, or that are next to, the valleys of the fingerprint as 20.

Figure 4D:
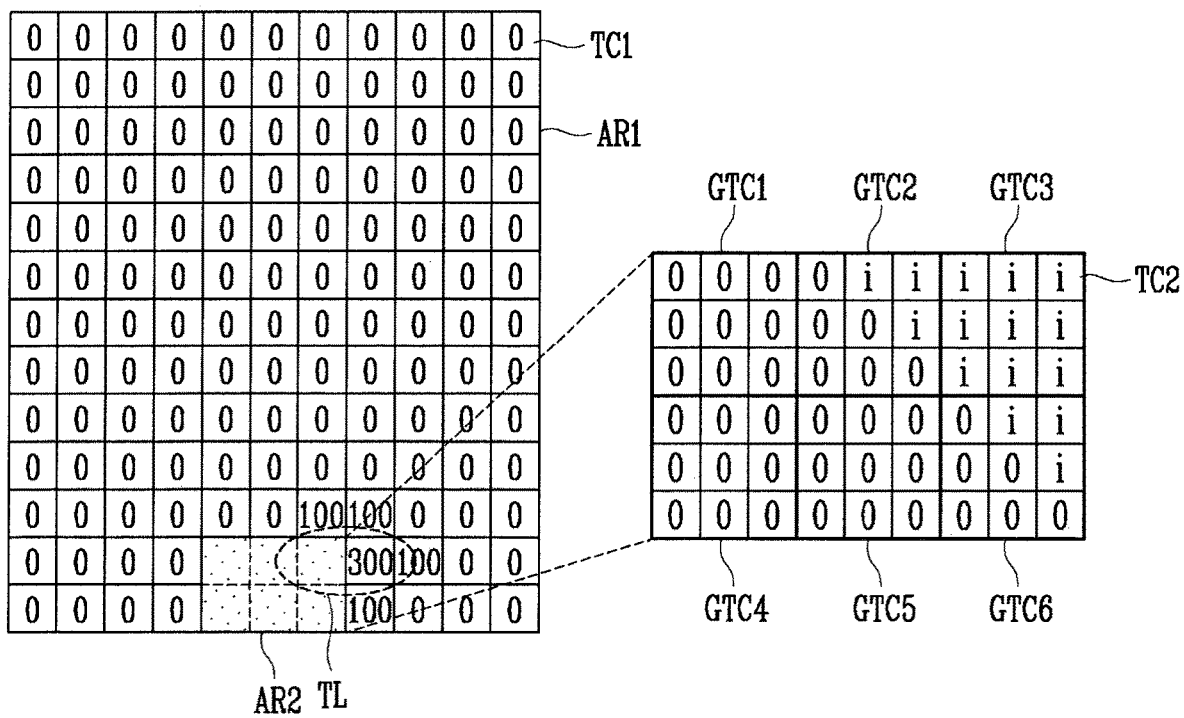

Referring to FIG. 4D, the second touch controller 100B may compare the second touch intensities with a threshold value (e.g., a critical value). The second touch controller 100B may determine second touch cells TC2 having second touch intensities greater than or equal to the threshold value to be in a touch-sensing state "i," and may determine second touch cells TC2 having second touch intensities that are smaller than the threshold value to be in a touch non-sensing state.

For example, when the threshold value is set to 10, the second touch controller 100B may determine second touch cells TC2 having second touch intensities that are greater than or equal to 10 to be in the touch-sensing state i.

In addition, the second touch controller 100B may calculate a ratio of the second touch cells TC2 in the touch-sensing state i in each touch-sensing group.

For example, the first, fourth, and fifth touch-sensing groups GTC1, GTC4, and GTC5 do not include any second touch cell TC2 in the touch-sensing state i, and therefore, the ratios of the first, fourth, and fifth touch-sensing groups GTC1, GTC4, and GTC5 are 0.

On the other hand, three of the second touch cells TC2 among the nine second touch cells TC2 in the second touch-sensing group GTC2 are in the touch-sensing state i, and therefore, the ratio of the second touch-sensing group GTC2 is 1/3.

In addition, all nine of the second touch cells TC2 in the third touch-sensing group GTC3 are all in the touch-sensing state i, and therefore, the ratio of the third touch-sensing group GTC3 is 1.

In addition, three of the second touch cells TC2 among the nine second touch cells TC2 in the sixth touch-sensing group GTC6 are in the touch-sensing state i, and therefore, the ratio of the sixth touch-sensing group GTC6 is 1/3.

Referring to FIG. 4E, the second touch controller 100B may calculate a representative touch intensity of each of the touch-sensing groups by multiplying the ratio of each of the touch-sensing groups by the maximum touch intensity to be sensed by the first touch cell TC1. That is, the second touch controller 100B may generate a representative touch intensity by scaling the second touch intensity.

For example, the second touch controller 100B may determine representative touch intensities of the first, fourth, and fifth touch-sensing groups GTC1, GTC4, and GTC5 as 0 by multiplying 0 by 300 that is the maximum intensity to be sensed by the first touch cell TC1.

On the other hand, the second touch controller 100B may determine a representative touch intensity of the second touch-sensing group GTC2 as 100 by multiplying 1/3 by 300, 300 being the maximum touch intensity.

In addition, the second touch controller 100B may determine a representative touch intensity of the third touch-sensing group GTC3 as 300 by multiplying 1 by 300, 300 being the maximum touch intensity.

In addition, the second touch controller 100B may determine a representative touch intensity of the sixth touch-sensing group GTC6 as 100 by multiplying 1/3 by 300.

The second touch controller 100B may generate touch information LO including the representative touch intensities of the respective touch-sensing groups, and may provide the touch information LO to the first touch controller 100A.

The first touch controller 100A may detect a touch position by using the first touch intensity and the representative touch intensities. That is, the first touch controller 100A may detect a maximum value among the first touch intensity and the representative touch intensities, and may determine an area corresponding to the maximum value among the first touch cell TC1 and the touch-sensing groups as the touch position.

In some embodiments, the first touch controller 100A may detect a maximum value among the first touch intensity and the representative touch intensities. The first touch controller 100A may determine an area corresponding to the maximum value among the first touch cell TC1 and the touch-sensing groups as a central portion of the touch TL, and may determine an area corresponding to a value that is smaller than the maximum value as a peripheral portion of the touch TL.

As described above, according to the touch-sensing mode, the touch sensor 10 according to the present disclosure, in fingerprint sensing, can sense a fingerprint on the second touch-sensing area AR2. The touch sensor 10 according to the present disclosure, in touch sensing, can calculate a representative touch intensity by scaling the second touch intensity of a second touch-sensing area AR2, and may detect a touch position by using the representative touch intensity.

In FIGS. 4A to 4E, it is illustrated that the second touch cells TC2 and the touch-sensing groups GTC have the same area. However, the present disclosure is not limited thereto, and the areas of the first and second touch cells TC1 and TC2 may be changed depending on the arrangement of the first and second driving electrodes TX1 and TX2 and the first and second sensing electrodes RX1 and RX2.

The numbers of the first and second touch cells TC1 and TC2 are merely provided for helping understanding of the present disclosure. However, the present disclosure is not limited thereto, and the numbers of the first and second touch cells TC1 and TC2 may be variously changed.

FIGS. 5A, 5B, 5C, and 5D are views illustrating an operating method of the touch sensor according to another embodiment of the present disclosure.

In FIGS. 5A to 5D, differences from the operating method of the touch sensor described in FIGS. 4A to 4E will be mainly described. Portions not particularly described in FIGS. 5A to 5D follow those of the above-described embodiment. In addition, identical reference numerals refer to identical components, and similar reference numerals refer to similar components.

Figure 5A:
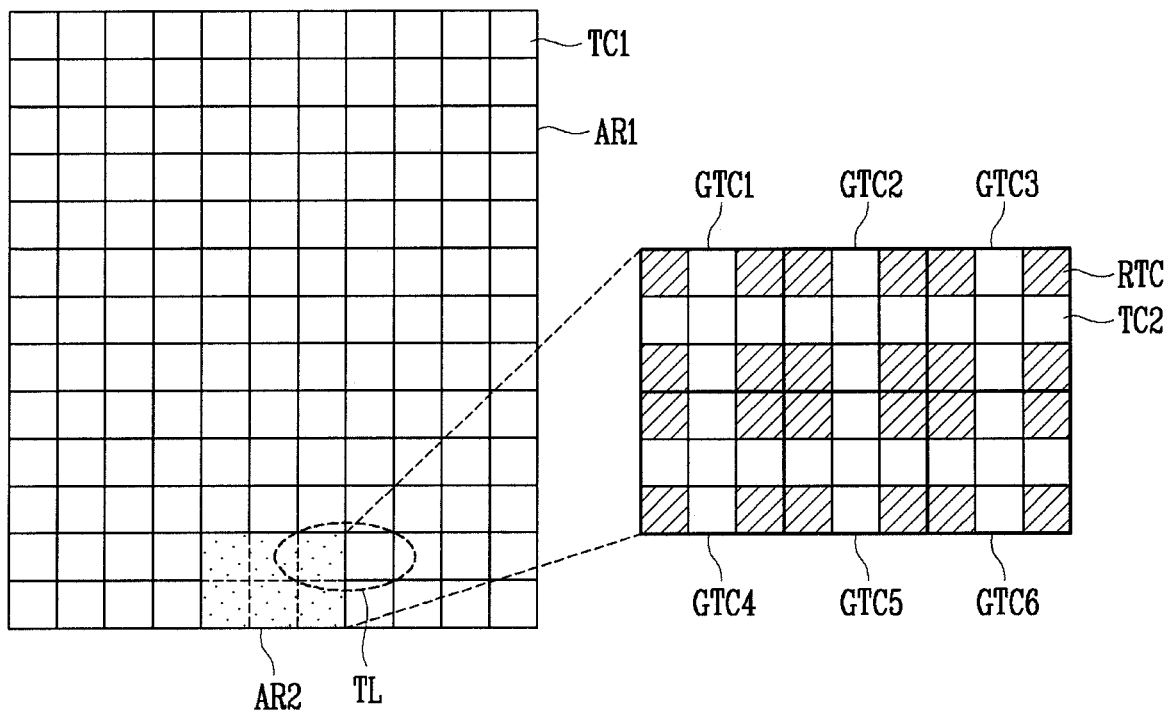
FIGS. 5A, 5B, 5C, and 5D are views illustrating an operating method of the touch sensor according to another embodiment of the present disclosure.

Referring to FIG. 5A, the second touch controller 100b may determine at least one representative touch cell RTC among the second touch cells TC2 in each touch-sensing group, and may determine a representative touch intensity by using a second touch intensity of the representative touch cell RTC.

For example, the second touch controller 100B may determine four second touch cells TC2 located at the corners among the 9 second touch cells TC2 in the touch-sensing group as representative touch cells RTC.

Meanwhile, the positions, number, etc. of the representative touch cells RTC shown in FIG. 5A are provided for convenience of description, and the present disclosure is not limited thereto. That is, the positions, number, etc. of the representative touch cells RTC may be variously changed.

Figure 5B:
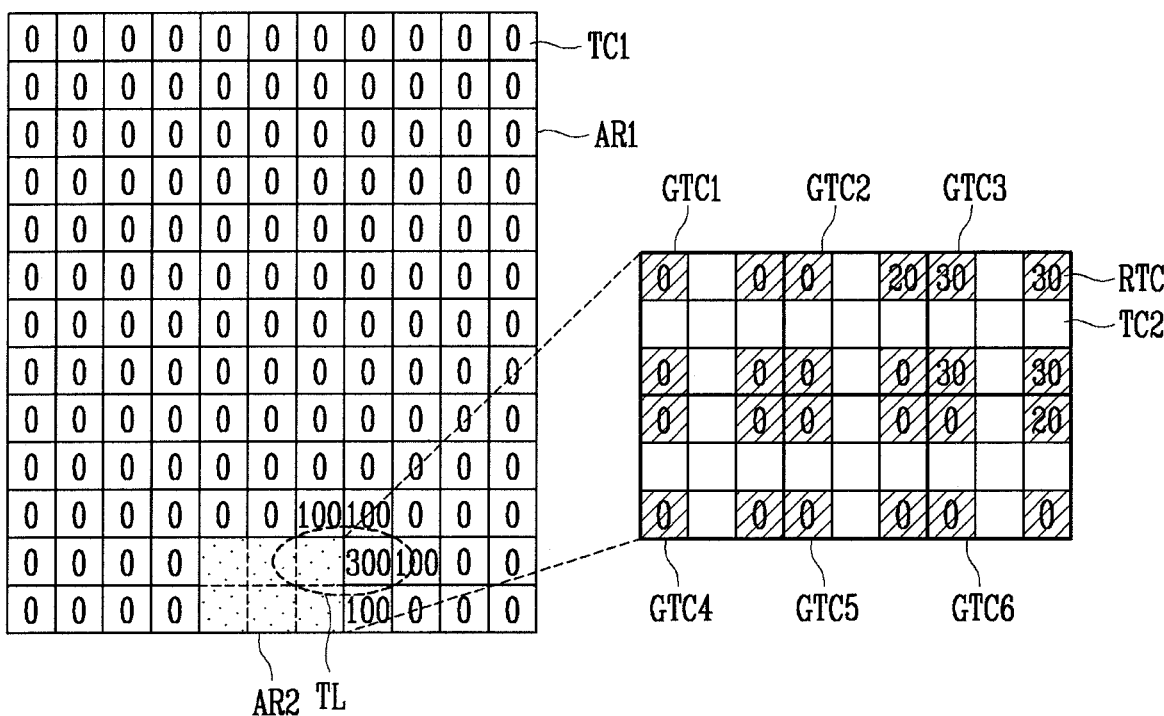

Referring to FIG. 5B, there are illustrated first touch intensities sensed by the respective first touch cells TC1 on the first touch-sensing area AR1, and second touch intensities sensed by the respective representative touch cells RTC on the second touch-sensing area AR2.

It may be determined that second touch intensities of representative touch cells RTC that are in contact with ridges of a fingerprint are greater than those of representative touch cells that are in contact with, or that are at areas that correspond to, valleys of the fingerprint.

For example, the second touch controller 100B may determine the second touch intensities of the representative touch cells RTC that are in contact with ridges of the fingerprint as 30, and may determine the second touch intensities of the representative touch cells that are in contact with valleys of the fingerprint as 20.

Figure 5C:
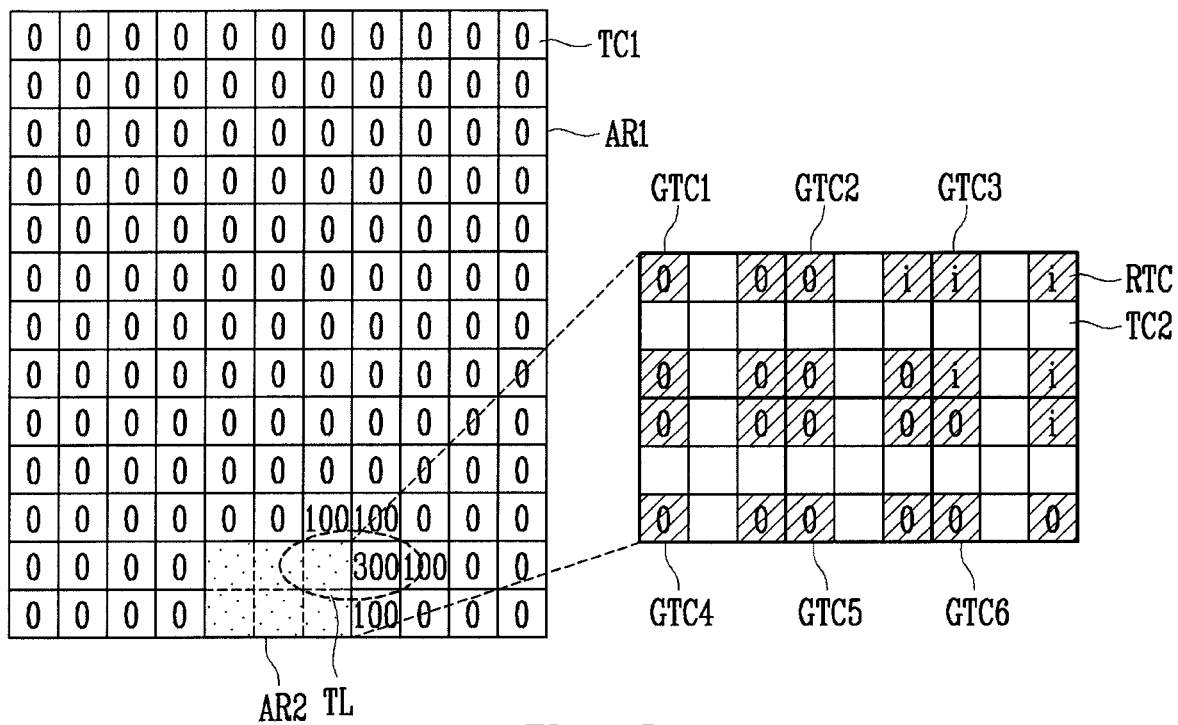

Referring to FIG. 5C, the second touch controller 100B may compare the second touch intensities with a threshold value. The second touch controller 100B may determine representative touch cells RTC having second touch intensities that are greater than or equal to the threshold value to be in a touch-sensing state i, and may determine representative touch cells RTC having second touch intensities that are smaller than the threshold value to be in a touch non-sensing state.

For example, when the threshold value is set to 10, the second touch controller 100B may determine second touch cells TC2 having second touch intensities that are greater than or equal to 10 to be in the touch-sensing state i.

In addition, the second touch controller 100B may calculate a ratio of the representative touch cells RTC in the touch-sensing state i in each touch-sensing group.

For example, the first, fourth, and fifth touch-sensing groups GTC1, GTC4, and GTC5 do not include any representative touch cell RTC in the touch-sensing state i, and therefore, the ratios of the first, fourth, and fifth touch-sensing groups GTC1, GTC4, and GTC5 are 0.

On the other hand, one representative touch cells RTC among the four representative touch cells RTC in the second touch-sensing group GTC2 is in the touch-sensing state i, and therefore, the ratio of the second touch-sensing group GTC2 is 1/4.

In addition, all four of the representative touch cells RTC in the third touch-sensing group GTC3 are all in the touch-sensing state i, and therefore, the ratio of the third touch-sensing group GTC3 is 1.

In addition, one representative touch cell RTC among the four representative touch cells RTC in the sixth touch-sensing group GTC6 is in the touch-sensing state i, and therefore, the ratio of the sixth touch-sensing group GTC6 is 1/4.

Figure 5D:
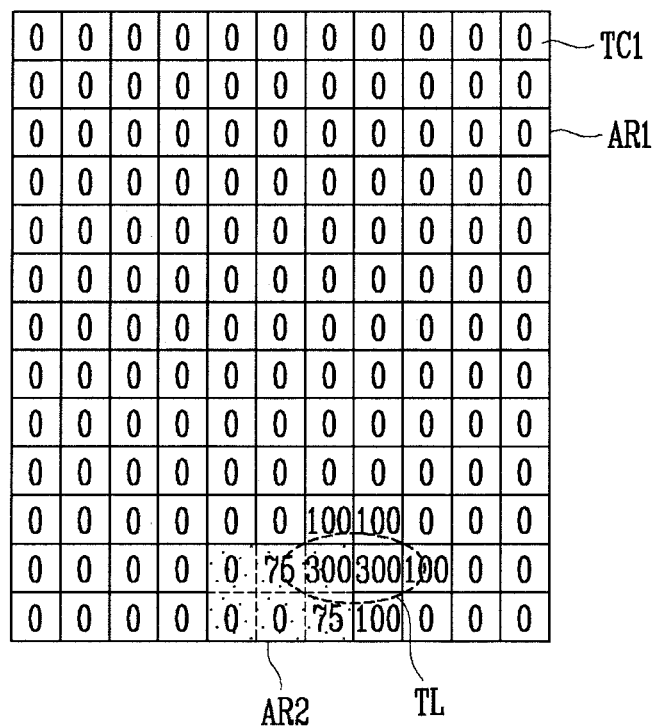

Referring to FIG. 5D, the second touch controller 100B may calculate a representative touch intensity of each of the touch-sensing groups by multiplying the ratio of each of the touch-sensing groups by the maximum touch intensity that is sensed by the first touch cell TC1.

For example, the second touch controller 100B may determine representative touch intensities of the first, fourth, and fifth touch-sensing groups GTC1, GTC4, and GTC5 as 0 by multiplying 0 by 300, 300 being the maximum intensity to be sensed by the first touch cell TC1.

On the other hand, the second touch controller 100B may determine a representative touch intensity of the second touch-sensing group GTC2 as 75 by multiplying 1/4 by 300.

In addition, the second touch controller 100B may determine a representative touch intensity of the third touch-sensing group GTC3 as 300 by multiplying 1 by 300, which is equal to the maximum touch intensity.

In addition, the second touch controller 100B may determine a representative touch intensity of the sixth touch-sensing group GTC6 as 75 by multiplying 1/4 by 300.

The second touch controller 100B may generate touch information LO including the representative touch intensities of the respective touch-sensing groups, and may provide the touch information LO to the first touch controller 100A.

The first touch controller 100A may detect a touch position by using the first touch intensity and the representative touch intensities. That is, the first touch controller 100A may detect a maximum value among the first touch intensity and the representative touch intensities, and may determine an area corresponding to the maximum value among the first touch cell TC1 and the touch-sensing groups as the touch position.

As described above, the touch sensor 10 according to the present embodiment can calculate representative touch intensities of the touch-sensing groups by selecting representative touch cells RTC among the second touch cells TC2, and by sensing only second touch intensities of the representative touch cells RTC. Accordingly, the touch sensor 10 according to the present embodiment can detect a touch position at high speed.

FIG. 6 is a flowchart illustrating an operating method of the touch sensor according to an embodiment of the present disclosure.

Referring to FIG. 6, the touch sensor 10 may sense first touch intensities in a first touch-sensing area AR1 by using first touch cells TC1 (S100).

The touch sensor 10 may sense second touch intensities in a second touch-sensing area AR2 adjacent to the first touch-sensing area AR1 by using second touch cells TC2 having an area that is smaller than that of the first touch cells TC1 (S110).

The touch sensor 10 may group at least some of the second touch cells TC2 among the second touch cells TC2 as a touch-sensing group such that the group of second touch cells TC2 has the same area as one of the first touch cells TC1 (S120).

The touch sensor 10 may calculate a representative touch intensity of the touch-sensing group by using the second touch intensities sensed by the second touch cells TC2 in the touch-sensing group (S130).

The touch sensor 10 may detect a touch position by using the first touch intensities and the representative touch intensity (S140).

In the touch sensor, the display device including the same, and the operating method of the touch sensor according to the present disclosure, according to the touch-sensing mode, a fingerprint on the touch-sensing area can be sensed in fingerprint sensing. In touch sensing, a touch intensity sensed in the touch-sensing area is scaled, and a touch position can be detected using the scaled touch intensity.

Example embodiments have been disclosed herein, and although specific terms are employed, they are used in, and are to be interpreted in, a generic and descriptive sense only, and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims and in their functional equivalents.

What is claimed is:

1. A method of operating a touch sensor, the method comprising:
sensing first touch intensities in a first touch-sensing area by using first touch cells;
sensing second touch intensities in a second touch-sensing area that is adjacent to the first touch-sensing area by using second touch cells each having an area that is smaller than that of each of the first touch cells;
grouping some second touch cells among the second touch cells as a touch-sensing group having a same area as one of the first touch cells;
calculating a representative touch intensity of the touch-sensing group by multiplying a maximum touch intensity sensed by the first touch cells by a ratio of a number of the grouped second touch cells indicating a respective touch intensity that is higher than a threshold value to a total number of the grouped second touch cells; and detecting a touch position by using the first touch intensities and the representative touch intensity.

2. The method of claim 1, wherein sensing the first touch intensities comprises sensing changes of mutual capacitances between first driving electrodes in the first touch cells and first sensing electrodes crossing the first driving electrodes.

3. The method of claim 1, wherein sensing the second touch intensities comprises sensing changes of mutual capacitances between second driving electrodes in the second touch cells and second sensing electrodes crossing the second driving electrodes.

4. A method of operating a touch sensor, the method comprising:
sensing first touch intensities in a first touch-sensing area by using first touch cells;
sensing second touch intensities in a second touch-sensing area that is adjacent to the first touch-sensing area by using second touch cells each having an area that is smaller than that of each of the first touch cells;
grouping some second touch cells among the second touch cells as a touch-sensing group having a same area as one of the first touch cells;
calculating a representative touch intensity of the touch-sensing group by using the second touch intensities sensed by second touch cells in the touch-sensing group; and
detecting a touch position by using the first touch intensities and the representative touch intensity,
wherein calculating the representative touch intensity comprises:
comparing the second touch intensity sensed by each of the second touch cells in the touch-sensing group with a threshold value;
determining the second touch cells in the touch-sensing group to be in a touch-sensing state when the second touch intensity is greater than or equal to the threshold value;
determining the second touch cells in the touch-sensing group to be in a touch non-sensing state when the second touch intensity is smaller than the threshold value;
calculating a ratio of the second touch cells in the touch-sensing group in the touch-sensing state among the second touch cells in the touch-sensing group; and
calculating the representative touch intensity by multiplying the ratio by a maximum touch intensity sensed by the first touch cells.

5. The method of claim 1, wherein, detecting the touch position comprises:
detecting a maximum value among the first touch intensities and the representative touch intensity; and
determining an area corresponding to the maximum value as the touch position.

6. The method of claim 1, further comprising sensing a fingerprint on the second touch-sensing area by using the second touch intensities in a fingerprint-sensing mode.

7. A method of operating a touch sensor, the method comprising:
sensing first touch intensities in a first touch-sensing area by using first touch cells;
sensing second touch intensities in a second touch-sensing area that is adjacent to the first touch-sensing area by using second touch cells each having an area that is smaller than that of each of the first touch cells;
grouping some second touch cells among the second touch cells as a touch-sensing group having a same area as one of the first touch cells;
calculating a representative touch intensity of the touch-sensing group by using the second touch intensities sensed by second touch cells in the touch-sensing group; and
detecting a touch position by using the first touch intensities and the representative touch intensity,
wherein calculating the representative touch intensity comprises:
determining representative touch cells among the second touch cells in the touch-sensing group;
comparing the second touch intensity sensed by each of the representative touch cells with a threshold value;
determining the representative touch cells to be in a touch-sensing state when the second touch intensity is greater than or equal to the threshold value;
determining the representative touch cells to be in a touch non-sensing state when the second touch intensity is smaller than the threshold value;
calculating a ratio of the representative touch cells in the touch-sensing state to the representative touch cells in the touch-sensing group; and
calculating the representative touch intensity by multiplying the ratio by a maximum touch intensity sensed by the first touch cells.

* * * * *